Aug. 15, 1961        W. H. L. DEIMER ET AL        2,996,075
                      VALVE CONSTRUCTION
Filed Nov. 20, 1959                            2 Sheets-Sheet 2

INVENTORS.
William H. L. Deimer.
BY John B. Urban.
Earl F. Riopelle.
Wood, Herron & Evans,
ATTORNEYS.

a corporation of Ohio
2,996,075
VALVE CONSTRUCTION

William H. L. Deimer, John B. Urban, and Earl F. Riopelle, Cincinnati, Ohio, assignors to The Lunkenheimer Company, Cincinnati, Ohio, a corporation of Ohio
Filed Nov. 20, 1959, Ser. No. 854,486
15 Claims. (Cl. 137—243)

The present invention relates to valves and is particularly directed to a novel valve construction including a torque reactor by means of which a valve can selectively be operated either as a rotating stem valve or as a non-rotating stem valve, or can be operated to regrind the valve seats in service without removing the valve from the line.

In many present day processing plants, such as those handling alumina slurry under pressure, sizable valves, for example 16" valves, were used to control material flow through a line. It is frequently necessary in such a plant to quickly close one or more lines. It has been found in actual service that a conventional valve adapted to operate in a single way, e.g., as a gear driven non-rotating stem valve or as a manually operated rotatable stem valve is not completely satisfactory. A gear operated valve requires too much time in an emergency where any appreciable delay in stopping material flow may result in substantial damage. On the other hand, the thrust required to close a valve is frequently so great that it is impossible to obtain a tight seal by manually rotating the valve stem. Furthermore, at times it is impossible to open by manually rotating the stem a large valve in which the seats have frozen. Moreover, many materials such as alumina slurry tend to form extremely hard deposits on the valve seats which prevent the valve from being closed completely either manually or with a gear operator.

The principal object of the present invention is to provide a heavy duty valve which can be operated in several different ways and can quickly be modified to select the particular type of operation needed to actuate the valve most effectively. Thus, for example, when closing the present valve in a pressure line of the type described, the initial closing can be effected by operating the valve as a rotating stem valve by locking a threaded sleeve surrounding the stem against rotation while manually turning the stem through a handle provided at its upper end. Since during the initial closing movements of the stem and disc only low closing thrust is required, the stem can easily and quickly be rotated to advance the disc toward its closed position. However, as the disc enters the pressure stream, a heavy thrust is required to completely seat the disc.

In accordance with the present invention, the valve during the final closing movements is converted to a non-rotating stem valve by locking the stem against rotation and applying a very high closing thrust to the stem through a gear operator or large handle which is effective to rotate the threaded sleeve or bushing surrounding the stem. The present valve is converted from one type of operation to the other by means of a novel torque reactor which is effective to selectively lock or unlock the stem against rotation. This torque reactor mechanism can be actuated without the use of any special tools in a matter of a second or two so that no time is lost in changing the valve over from one kind of operation to the other.

An additional object of the present invention is to provide a valve in which the seats can be reground in service without the necessity of moving the valve from the line. In accordance with the present invention, this regrinding operation, which is effective to grind away or remove any hard material formation on the seats, is accomplished by bringing the valve disc into pressure engagement with the seat and thereafter rotating the disc in contact with the seat.

The present invention is predicated upon the concept of providing a valve including a torque reactor mechanism effective to selectively lock or unlock the valve stem for rotation while at all times permitting opening and closing linear movements of the stem. In accordance with the present invention, the valve further includes means for readily locking the stem for rotation with a surrounding bushing so that the stem can be turned without simultaneously advancing or retracting the valve disc during regrinding.

More particularly, in a valve constructed in accordance with the present invention, a threaded valve stem is supported in an internally threaded, rotatable yoke bushing. The bushing is in turn connected to a gear drive which can either be hand or power operated. As an alternative, the bushing can also be provided with a large handle. The valve stem carries at its lower end a disc or other closure member disposed for engagement with a stationary valve seat. The stem additionally carries a torque reactor assembly including a hub mounted on the stem and a plate surrounding the hub and having portions in sliding engagement with ribs formed on arms of the yoke member of the valve housing.

The center hub of the torque reactor is locked to the valve stem by means of keys, or the like, and is adapted to be selectively locked to the torque reactor plate by means of a U-shaped reactor pin. More particularly, the hub and reactor plate are each provided with two oppositely facing spaced transverse grooves. When the grooves of the hub and reactor plate are brought into alignment they form two spaced bores adapted to receive the arms of the reactor pin. When the reactor pin is inserted in these grooves, the hub and stem are locked to the reactor plate. This plate is in turn locked against rotation by its engagement with the yoke ribs, but is free for sliding vertical movement. Consequently, with the reactor pin in place, the stem can be shifted to an open or closed position by rotating the threaded bushing in engagement with the stem, through the gear operator or a handle on the bushing. The stem is thus shifted as a non-rotating stem and a large force can be applied to the disc either to firmly seat the disc or to free the disc if it should become frozen.

Alternatively, the present valve is adapted to be operated as a rotating stem valve. When the valve is to be operated in this manner, the torque reactor pin is pulled free from engagement with the hub and reactor plate leaving the hub and stem free to rotate. The stem is provided with a handle on its upper end for manually rotating the stem in this type of operation. When the valve is operated as a rotating stem valve, the threaded sleeve is locked against rotation either by means of the inherent friction in its associated gear operator or by means of any suitable positive mechanical lock, such as a removable pin inserted in an opening in the valve retaining plate and in engagement with one of the gears.

In accordance with the present invention, the valve seats are ground in place by removing the reactor pin and unlocking the gear operator for movement. In the regrinding operation, the movable valve seat or disc is lowered into contact with the stationary seat and thereafter the yoke bushing and valve stem are locked together by means of a jam nut which is carried by the upper end of the stem and is adapted to be threaded into abutment with the upper end of the bushing to lock the bushing and stem for simultaneously rotating the disc. Thereafter, the valve stem is rotated by the gear operator or by means of the handle provided on the stem or bushing to rotate the disc in contact with its seats. This method of regrinding is highly efficient in removing material build-up or deposits on the seats, such as occur when the valve is used to handle slurries and similar materials.

One of the advantages of the present valve is that the valve seats can be reground without removing the valve from the line.

Another advantage of the present valve is that the valve can be changed from one manner of valve operation to another or can be set up for seat regrinding in a few seconds by merely inserting or removing the reactor pin. No special tools of any kind are required.

Another advantage of the present torque reactor mechanism is that it is extremely rugged and can be used on very large size valves subjected to heavy service loads.

Another advantage of the present torque reactor mechanism is that it is compact and is mounted between the two ribs of a valve yoke. Thus, the torque reactor mechanism is not exposed, eliminating any chance of its being struck and damaged or the reactor pin inadvertently being knocked loose.

A still further object of the present invention is to provide a valve disc construction particularly adapted for use in a valve having the present torque reactor mechanism. More particularly, the present invention contemplates a valve construction in which a valve disc is mounted upon the stem in such a manner that the disc is positively rotated with the stem, but yet is capable of limited universal movement relative to the stem so that the disc is free to accommodate itself to the valve seat.

These and other objects and advantages of the present invention will be more readily apparent from a further consideration of the following detailed description of the drawings illustrating a preferred embodiment of the invention.

In the drawings:

FIGURE 1 is a vertical cross sectional view through an angle valve constructed in accordance with the principles of the present invention.

FIGURE 2 is a cross sectional view taken along line 2—2 of FIGURE 1.

FIGURE 3 is a cross sectional view taken along line 3—3 of FIGURE 1.

Figure 4:
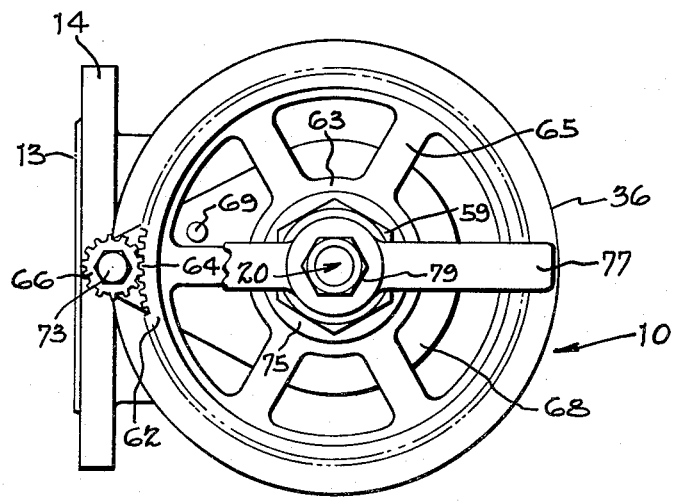
FIGURE 4 is a top plan view of the valve shown in FIGURE 1.
Figure 5:
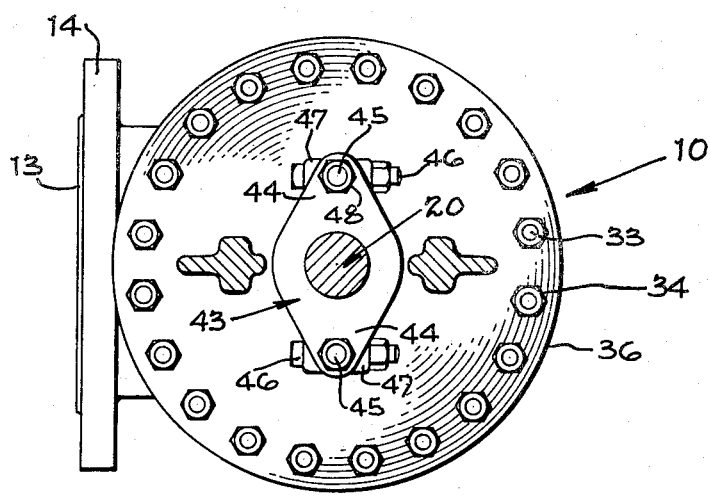
FIGURE 5 is a cross sectional view taken along line 5—5 of FIGURE 1.

FIGURE 1 shows an angle valve 10 embodying a torque reactor of the present invention. It is to be understood, however, that the present torque reactor can be employed with other types of valves, for example an ordinary globe valve. As is shown in FIGURE 1, valve 10 comprises a body 11 provided with an inlet port 12 and an outlet port 13. Each of these ports is surrounded by a conventional bolt flange 14 for securing the valve to inlet and outlet lines.

Body 11 is further provided with an annular groove 15 disposed adjacent to the inner end of inlet port 12. This groove receives a hardened metal seat ring 16 faced with any suitable hard seating material, such as stellite. Ring 16 is mounted within the recess 15 in any suitable manner, such as welding or brazing, or could be screwed in. Seat ring 16 is provided with an inwardly tapered seating surface 17 disposed for engagement with a valve disc member 18. Disc member 18 can be formed of any suitable material and is preferably faced with a hard seating material, such as stellite.

Disc member 18 is secured to the lower end of valve stem 20 by means of an assembly including retaining plate 21, studs 22 and a stem cap member 23. More particularly, as is best shown in FIGURES 1 and 3, the lowermost end of stem 20 can be threaded at 24 to carry stem cap member 23, or this member can be made integral with the upper part of the stem. Stem cap member 23 includes a hexagonal portion 25 loosely fitted within a hexagonal opening in retaining plate 21. It is to be understood that this fitting provides for play, or limited relative movement, between the stem and retaining plate 21, while at the same time providing a positive connection between those members so that when stem 20 is rotated retaining plate 21 and disc 18 are also positively rotated. The lowermost end of cap 23 is provided with a radial flange 26 of circular cross section. This flange is loosely fitted within a cylindrical recess 27 in seat member 18.

As is best shown in FIGURE 1, the lowermost end of cap 23 is rounded as at 28 to facilitate relative tilting movement of the seat member 18 in any direction relative to cap 23 and stem 20. The upper surface of radial flange 26 forms a shoulder 30 which bears against retaining plate 21. The retaining plate is mounted upon member 18 by means of studs 22 which engage threaded openings in disc member 18 and threadably receive nuts 31 which abut the upper surface of retaining plate 21.

Valve 10 further comprises a yoke section 32 which is bolted to body portion 11 by means of a ring of studs 33. The opposite ends of each of the studs 33 carry nuts 34 and 35 which respectively abut flanges 36 and 37 formed on yoke member 32 and body member 11. A suitable gasket 38 is interposed between abutting shoulders of body 11 and yoke 32 to provide a fluid tight seal between these members. At its lower end yoke member 32 is provided with an annular bearing portion 40 for supporting and guiding the lower portion of stem 20. An annular opening 41 is formed above bearing 40 and is adapted to receive packing material 42 which is held in place by means of a packing gland 43. Packing gland 43 surrounds stem 20 and is provided with two diametrically opposed ears 44 which receive I-bolts 45. The lower ends of I-bolts 45 are mounted upon transverse bolts 46 carried by spaced upstanding flanges 47 formed on yoke member 32. The upper ends of I-bolts 45 carry nuts 48 for tightening the packing gland.

The upper end of yoke member 32 is provided with an annular bearing receiving recess 49. This annular recess supports upper and lower roller bearings 50 and 51. These bearings rotatably support yoke bushing members 52. However, it will be appreciated that on some sizes the construction can be made without roller bearings for the yoke bushing.

More particularly, yoke bushing 52 is a tubular member having a threaded central portion 53 in engagement with the threaded portion 54 of stem 20. Yoke bushing 52 is provided with an outwardly extending radial flange 55 which is mounted between bearings 50 and 51. The peripheral walls of yoke bushing 52 engage bearing sleeves 56 and 57 which surround the sleeve and respectively abut the inner walls of an opening in a retaining plate 68 and the upper opening in yoke member 32. Suitable grease seals 58 are disposed below and above bearing sleeves 56 and 57. These seals function to retain grease within annular chamber 49, grease being applied to the valve through suitable Alemite fittings 39 mounted in a wall of the yoke member communicating with bearings 50 and 51 and annular space 49. As is shown in FIGURE 1, bushing 52 is provided with a radial groove 29 for permitting grease to flow into engagement with mating threads 53 and 54.

The uppermost end 60 of yoke bushing 52 is keyed by means of keys 61 to a large gear 62, the gear being held in place by a nut 59 threaded over the end of the bushing. Gear 62 includes a hub portion 63 mounted upon the upper end 60 of bushing 52 and a peripheral set of gear teeth 64. The hub and peripheral gear teeth are interconnected by a plurality of spaced radial arms 65. Teeth 64 mesh with a pinion 66 which is rotatably journalled in extending arm portion 67 of retaining plate member 68.

Retaining plate 68 is bolted to the upper end of yoke member 32 as by means of bolts 70. A small vertical bore is preferably formed in the upper surface of retaining member 68 for receiving a locking pin 69 (FIGURE 4). This pin is inserted in the bore and extends upwardly between the spokes of gear 62 when it is desired to positively lock the gear against rotation. The outer end of extension arm 67 is provided with a vertical bore which houses bearing sleeves 71. These bearing sleeves rotatably journal shaft 72 which is keyed to pinion 66. The upper end of shaft 72 is provided with a head 73 adapted to receive a hand wrench. The lower end of shaft 72 is pinned to or otherwise carries a coupling square 74 adapted for engagement with an air or power wrench.

The uppermost end of stem 20 carries a jam nut 75 and is provided with a step-down portion 76 which receives a handle 77, the handle being keyed to the shaft as by means of keys 78. A lock nut 79 secures the handle and stem in assembled relationship. As is shown in FIGURE 1, stem 20 is sufficiently long so that when disc 18 is in engagement with seat 16 the stem extends an appreciably distance above gear 62 providing clearance between the upper end of yoke 52 and handle 77 so that jam nut 75 is spaced from the yoke bushing.

In addition to the elements described above, the present valve construction comprises a torque reactor mechanism 80. The details of this mechanism are best shown in FIGURES 1 and 2. More particularly, torque reactor 80 comprises a hub 81 which surrounds stem 20. Hub 81 is keyed to the stem by means of keys 82. Additionally, the hub is fixed longitudinally of the stem by means of a set screw 83 which threadably engages the hub and enters a radial bore formed in stem 20. Hub 81 also is provided with an outwardly extending radial flange 84 disposed adjacent to the lower edge of the hub. A torque reactor plate 85 surrounds hub 81. Plate 85 includes a central bore of slightly larger diameter than the diameter of the hub 81, but of lesser diameter than the diameter of radial flange 84. An annular recess is formed in the bottom of the plate 85 for receiving radial flange 84. The engagement of flange 84 and this recess provides a support for the torque reactor plate 85 on hub member 81. The torque reactor plate 85 is prevented from upward disengagement with the hub by means of bolts 87. Annular ring 86 extends outwardly beyond hub 81 into engagement with the upper face of reactor plate 85.

As is best shown in FIGURE 2, the opposite ends of reactor plate 85 are provided with enlarged notches 88 which embrace opposed inwardly facing ribs 90 of yoke member 32. Notches 88 are appreciably larger than ribs 90 so that torque reactor plate 85 can freely move longitudinally along ribs 90. However, the engagement of ribs 90 and the walls of notches 88 is effective to prevent rotation of torque reactor plate 85 relative to the yoke member 32.

Torque reactor plate 85 and hub 81 are selectively coupled by means of torque reactor pin 92. This torque reactor pin is of U-shaped configuration and includes parallel arms 93 and an interconnecting portion 94. The ends of arm 93 are preferably tapered as at 95 to facilitate insertion of the torque reactor pin into mating bores formed in the torque reactor plate 85 and hub 81.

More particularly, hub 81 is provided with two parallel grooves 96 formed at diametrically opposite sides of the hub. Grooves 96 extend parallel to one another and are perpendicular to a diameter extending between the grooves. In cross sectional size, grooves 96 are approximately equal to one-half the cross sectional size of arms 93 of torque reactor pin 92.

Torque reactor flange 85 is also provided with two parallel grooves 97. Grooves 97 intersect the central opening of the torque reactor plate in registry with grooves 96 of hub member 81. Grooves 97 are parallel to one another and are of substantially the same size as grooves 96 so that when the two sets of grooves 96 and 97 are in opposed alignment with one another, as shown in FIGURES 1 and 2, they form two grooves of generally circular cross section adapted to snugly receive parallel arms 93 of torque reactor pin 92.

When torque reactor pin 92 is inserted in the aligned openings in reactor plate 85 and hub 81, the hub is locked against rotation. Since the hub is in turn keyed to stem 20, the stem is also locked against rotation. However, reactor plate 85 is free to slide vertically along ribs 90 so that the stem is freely movable in a vertical direction to advance or retract disc 18 relative to its seat 16. On the other hand, when reactor pin 92 is withdrawn, hub 81 is free to rotate relative to torque reactor flange 85 so that the stem is likewise freed for rotation. With the reactor pin removed, however, the hub and torque reactor flange still move vertically with valve stem 20.

The present valve is adapted to be operated in a number of different ways. Assuming that heavy stem thrusts are required in a particular installation, it is desirable to operate the valve as a non-rotating stem valve. Accordingly, the reactor pin is inserted in aligned bores 96 and 97 of hub 81 and reactor flange 85. If necessary to align these bores, stem 20 and hub 81 can be initially rotated by means of handle 77. After the reactor pin has been inserted in the aligned bores, it is held in place by frictional force and functions to lock the hub and stem against rotation. If quick operation of the valve is desired, an air or power wrench is applied to coupling square 74 pinned to shaft 72. Rotatation of this nut causes similar rotation of pinion 66 and large gear 62. Gear 62 is keyed to yoke bushing 52 and is effective to cause that bushing to rotate in roller bearings 50 and 51. As yoke bushing 52 rotates, threads 53 on the bushing cooperatively engage threads 54 on the stem and cause the stem to be driven downwardly to bring seat 18 into engagement with seat ring 16. If additional thrust is required after the seat disc 16 has been closed, a hand wrench is applied to head 73. Obviously, a hand wrench can be employed during the entire valve closing operation if the speed of closure of the valve is not important.

During the closing motion of the valve stem, torque reactor plate 85 slides downwardly along ribs 90 of arms 91. While notches 88 are sufficiently large to provide for ready movement of the plate in a vertical direction they at all times engage ribs 90 to positively prevent rotative movement of the reactor plate. It is important to note that when disc 18 engages the tapered seat of seating ring 16, the disc is universally movable due to the play between retaining plate 21 and the hexagonal opening in cap 23. This universal movement is further aided by the rounded bottom 28 on stem cap 23.

To open the valve it is merely necessary to rotate head 73 or coupling square 74 in the opposite direction using a manual or power operated wrench. This will cause rotation of shaft 72, pinion 66 and gear 62 in the opposite direction from the direction of rotation during closing. Gear 62 is in turn effective to cause rotation of yoke bushing 52, while the threads on this bushing are effective to raise stem 20.

Valve 10 can also be operated as a rotating stem valve when manual operation is desired and exceedingly heavy loads are not present. The valve can also be operated in this way to effect initial closing movements of the valve before the valve is tightly shut by means of a wrench as described above.

To operate the valve in this manner, torque reactor pin 92 is removed from engagement with the bushing 81 and reactor plate 85. This is simply done by grasping the connecting portion of the U-shaped pin and pulling the pin outwardly. At the same time, yoke bushing 52 is locked against rotation. In many cases, the frictional resistance to rotation of gear 62 and pinion 66 is sufficient to hold yoke 52 against rotary movement. However, in the event that this friction is not of sufficient magnitude, a pin 69 is placed in a bore formed on the top of extension arm 67. This pin extends upwardly between radial arms 65 of gear 62 and the abutment of the pin with one of the arms of gear 62 positively locks gear 62 and yoke bushing 52 in place.

Thereafter, in order to close the valve it is merely necessary to turn handle 77 by hand. Rotation of this handle, which is keyed to stem 20, causes the stem to rotate and the threaded engagement of the stem with yoke bushing 52 causes the stem to be lowered to bring disc 18 into engagement with seat 16. Again, disc 18 is free to shift universally so that it is automatically accommodated to seat 16 to provide a tight seal. When operated as a rotating stem valve, the valve is opened merely by turning handle 77 in the reverse direction.

In addition to operation as a non-rotating stem valve and as a rotating stem valve, the present valve can be operated to regrind its seats without removing the valve from the line. When the valve seats are to be reground in place, disc 18 is first lowered into engagement with seat 16 either by means of handle 77 (if torque reactor pin 92 is removed) or through pinion 66 and gear 62 (if torque reactor pin is operatively connected to the hub 81 and torque reactor flange 85). After seat 18 has been brought into engagement with seat ring 16, torque reactor pin 92 is removed and jam nut 75 is turned until it tightly engages the upper end 60 of yoke bushing 52.

As is shown in FIGURE 1, the end of the yoke bushing 52 extends upwardly beyond nut 59 for engagement with this jam nut. When the jam nut has thus been tightened down, yoke bushing 52 and stem 20 are locked together and consequently rotate in unison. Thereafter, the stem can be rotated without being either raised or lowered either by turning handle 77 or by applying a wrench to head 73. As stem 20 is rotated, the engagement of the hexagonal portion 25 of stem cap 23 with the hexagonal opening in retaining plate 21 causes positive rotation of disc 18 relative to seats 16. Thus, the disc is rotated over the seat and the disc and seat are simultaneously reground or lapped to remove any material deposits or build-up on either of these members.

From the above disclosure of the general principles of the present invention, and the foregoing detailed description of a preferred embodiment, those skilled in the art will readily comprehend various modifications to which the invention is susceptible. Thus, for example, on small valves it is contemplated that the torque reactor plate can be omitted. In such a modification, the remaining elements of the valve are essentially the same as those described and include a hub similar to hub 81 which is keyed or otherwise secured to a valve stem.

In such a modification, the hub is provided with two spaced parallel grooves for receiving a torque reactor pin. This pin is of sufficient length so that when it is inserted in the grooves it is positioned generally similar to the position of torque reactor pin 92. The torque reactor pin engages the yoke arms when hub 81 tends to rotate and the engagement of the torque reactor pin with the yoke arms is thus effective to prevent rotation of the hub and stem in generally the same manner that the hub and stem are locked in the preferred embodiment.

Having described our invention, we claim:

1. In a valve of the type having a threaded rotatable stem a pair of spaced ribs extending parallel to said stem, a bushing surrounding said stem in threaded engagement therewith, and means for rotating said bushing, the improvement which comprises a torque reactor, said torque reactor comprising a hub surrounding said stem at a portion intermediate the ends thereof, means fixedly securing said hub to said stem for rotation therewith, a second member surrounding said hub and having portions in sliding engagement with said ribs, said hub and said second member being respectively provided with bores disposed to be brought into alignment, and a pin removably insertable into said bores for selectively locking said hub to said second member.

2. In a valve of the type including a threaded rotatable stem, a pair of spaced ribs extending parallel to said stem, a bushing surrounding said stem in threaded engagement therewith, and means for rotating said bushing, the improvement which comprises a torque reactor, said torque reactor comprising a hub surrounding said stem at a portion intermediate the ends thereof, means fixedly securing said hub to said stem for rotation therewith, a second member surrounding said hub and having spaced recessed portions in respective engagement with said ribs, said hub and said second member being respectively provided with bores disposed to be brought into alignment, and a pin removably insertable into said bores for selectively locking said hub to said second member.

3. In a valve of the type including a threaded rotatable stem, a pair of spaced ribs extending parallel to said stem, a bushing surrounding said stem in threaded engagement therewith, and means for rotating said bushing, the improvement which comprises a torque reactor, said torque reactor comprising a hub surrounding said stem at a portion intermediate the ends thereof, means fixedly securing said hub to said stem for rotation therewith, a second member surrounding said hub and having spaced recessed portions in respective sliding engagement with said ribs, said hub and said second member being respectively provided with two spaced bores disposed to be brought into alignment, the bores of the other of said members and a U-shaped pin removably insertable into said bores for selectively locking said hub to said second member.

4. In a valve of the type comprising a threaded rotatable stem, a pair of spaced ribs extending parallel to said stem, a bushing surrounding said stem in threaded engagement therewith, and means for rotating said bushing, the improvement which comprises a torque reactor, said torque reactor comprising a hub surrounding said stem at a portion intermediate the ends thereof, means fixedly securing said hub to said stem for rotation therewith, a torque reactor plate surrounding said hub and having spaced recessed portions in sliding engagement with said ribs, retaining means carried by said hub in engagement with said reactor plate for holding said reactor plate in longitudinal alignment with said hub, said hub and said torque reactor being respectively provided with bores disposed to be brought into alignment and a pin removably insertable into said bores for selectively locking said hub to said reactor plate.

5. In a valve of the type comprising a threaded rotatable stem, a pair of spaced ribs extending parallel to said stem, a bushing surrounding said stem in threaded engagement therewith, and means for rotating said bushing, the improvement which comprises a torque reactor, said torque reactor comprising a hub surrounding said stem at a portion intermediate the ends thereof, means fixedly securing said hub to said stem for rotation therewith, a torque reactor plate surrounding said hub and having spaced retraining portions in sliding engagement with said ribs, means for holding said torque reactor plate and said hub in longitudinal alignment, said hub and said torque reactor plate each being respectively provided with two spaced bores, the respective bores of said hub and torque reactor plate being disposed to be brought into opposed registry, and a U-shaped pin removably insertable into said bores for selectively locking said hub to said second member.

6. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, a valve disc carried by said stem for engagement with said seat, a handle mounted upon the end of said stem remote from said disc, means interconnected with said yoke bushing for rotating said bushing, and a torque reactor, said torque reactor comprising a hub surrounding said stem at a portion intermediate said disc and said yoke bushing, means securing said hub to said stem for rotation therewith, a second member surrounding said hub in sliding engagement with said ribs, said hub and said second member being respectively provided with bores disposed to be brought into alignment, and a pin removably insertable into said bores for selectively locking said hub to said second member.

7. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, a valve disc carried by said stem for engagement with said seat, a handle mounted upon the end of said stem remote from said seat, means interconnected with said yoke bushing for rotating said bushing, and a torque reactor, said torque reactor comprising a hub surrounding said stem at a portion intermediate the ends thereof, means fixedly securing said hub to said stem for rotation therewith, a second member surrounding said hub and having spaced recessed portions in respective sliding engagement with said ribs, said hub and said second member being respectively provided with bores disposed to be brought into alignment, and a pin removably insertable into said bores for selectively locking said hub to said second member.

8. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, a valve disc carried by said stem for engagement with said seat, a handle mounted upon the end of said stem remote from said seat, means interconnected with said yoke bushing for rotating said bushing and a torque reactor, said torque reactor comprising a hub surrounding said stem at a portion intermediate the ends thereof, means fixedly securing said hub to said stem for rotation therewith, a second member surrounding said hub and having spaced recessed portions in respective sliding engagement with said ribs, said hub and said second member each being respectively provided with two spaced bores disposed to be brought into alignment, the bores of the other of said members and a U-shaped pin removably insertable into said bores for selectively locking said hub to said second member.

9. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, a valve disc carried by said stem for engagement with said seat, a handle mounted upon the end of said stem remote from said seat, means interconnected with said yoke bushing for rotating said bushing and a torque reactor, said torque reactor comprising a hub surrounding said stem at a portion intermediate the ends thereof, means fixedly securing said hub to said stem for rotation therewith, a torque reactor plate surrounding said hub and having spaced recessed portions in sliding engagement with said ribs, retaining means carried by said hub in engagement with said reactor plate for holding said reactor plate in longitudinal alignment with said hub, said hub and said torque reactor being respectively provided with bores disposed to be brought into alignment and a pin removably insertable into said bores for selectively locking said hub to said reactor plate.

10. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, a valve disc carried by said stem for engagement with said seat, a handle mounted upon the end of said stem remote from said seat, means interconnected with said yoke bushing for rotating said bushing and a torque reactor, said torque reactor comprising a hub surrounding said stem at a portion intermediate the ends thereof, means fixedly securing said hub to said stem for rotation therewith, a torque reactor plate surrounding said hub and having spaced retaining portions in sliding engagement with said ribs, means for holding said torque reactor plate and said hub in longitudinal alignment, said hub and said torque reactor plate each being respectively provided with two spaced bores, the respective bores of said hub and torque reactor plate being disposed to be brought into opposed registry, and a U-shaped pin removably insertable into said bores for selectively locking said hub to said second member.

11. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, a valve disc adapted for engagement with said seat, means securing said disc to said stem whereby said disc is positively rotated upon rotation of said stem, but is universally movable relatively thereto, a handle mounted upon said stem, means interconnected with said yoke bushing for rotating said bushing, a torque reactor, said torque reactor comprising a hub surrounding said stem at a portion intermediate said disc and said yoke bushing, means securing said hub to said stem for rotation therewith, a second member surrounding said hub in sliding engagement with said yoke ribs, said hub and said second member being respectively provided with bores disposed to be brought into alignment, and a pin removably insertable into said bores for selectively locking said hub to said second member.

12. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, a valve disc adapted for engagement with said seat, means securing said disc to said stem whereby said disc is positively rotated upon rotation of said stem, but is universally movable relatively thereto, a handle mounted upon said stem, means interconnected with said yoke bushing for rotating said bushing, a torque reactor, said torque reactor comprising a hub surrounding said stem at a portion intermediate said disc and said yoke bushing, means securing said hub to said stem for rotation therewith, a second member surrounding said hub in sliding engagement with said yoke ribs, said hub and said second member being respectively provided with bores disposed to be brought into alignment, and a pin removably insertable into said bores for selectively locking said hub to said second member, said means securing said disc to said stem comprising a cap having a polygonal opening formed therein, said cap being threaded over the lowermost end of said sleeve, and a retaining plate having a polygonal opening slightly larger than the cap, said opening loosely receiving said cap and means securing said retaining plate to said disc.

13. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, means for selectively locking said bushing to said stem, a valve disc carried by said stem for engagement with said seat, a handle mounted upon the end of said stem remote from said disc, means interconnected with said yoke bushing for rotating said bushing, and a torque reactor, said torque reactor comprising a hub surrounding said stem at a portion intermediate said disc and said yoke bushing, means securing said hub to said stem for rotation therewith, a second member surrounding said hub in sliding engagement with said ribs, said hub and said second member being respectively provided with bores disposed to be brought into alignment, and a pin removably insertable into said bores for selectively locking said hub to said second member.

14. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, means for selectively locking said bushing to said stem, a jam nut threadably carried by said stem and adapted for abutment with said bushing, a valve disc carried by said stem for engagement with said seat, a handle mounted upon the end of said stem remote from said disc, means interconnected with said yoke bushing for rotating said bushing, and a torque reactor, said torque reactor comprising a hub surrounding said stem at a portion intermediate said disc and said yoke bushing, means securing said hub to said stem for rotation therewith, a second member surrounding said hub in sliding engagement with said ribs, said hub and said second member being respectively provided with bores disposed to be brought into alignment, and a pin removably insertable into said bores for selectively locking said hub to said second member.

15. A valve, said valve comprising a housing, an annular valve seat disposed within said housing, a yoke interconnected to said housing, said yoke comprising two spaced ribs, and an opening spaced from said seat, a yoke bushing, means rotatably supporting said bushing within said opening, said bushing having an internal thread formation, a stem threadably engaging said bushing, a jam nut threadably carried by said stem and disposed for abutment with said bushing, a valve disc carried by said stem for engagement with said seat, a handle mounted upon the end of said stem remote from said seat, means interconnected with said yoke bushing for rotating said bushing and a torque reactor, said torque reactor comprising a hub surrounding said stem at a portion intermediate the ends thereof, means fixedly securing said hub to said stem for rotation therewith, a torque reactor plate surrounding said hub and having spaced recessed portions in sliding engagement with said ribs, retaining means carried by said hub in engagement with said reactor plate for holding said reactor plate in longitudinal alignment with said hub, said hub and said torque reactor being respectively provided with bores disposed to be brought into alignment and a pin removably insertable into said bores for selectively locking said hub to said reactor plate.

References Cited in the file of this patent

UNITED STATES PATENTS

| | | |
|---|---|---|
| 863,180 | Howard | Aug. 13, 1907 |
| 956,772 | Knauf | May 3, 1910 |
| 1,044,259 | Schiller | Nov. 12, 1912 |
| 1,232,461 | Eckenroth | July 3, 1917 |
| 1,404,103 | Eckenroth | Jan. 17, 1922 |
| 1,777,115 | Bruback | Sept. 30, 1930 |
| 1,991,621 | Noll | Feb. 19, 1935 |